# 2,816,928
Patented Dec. 17, 1957

2,816,928

BIS(1-AMINOCYCLOALKYL METHYL) AMINES

Robert Arthur Smiley, Woodbury, N. J., assignor to E. I. du Pont de Nemours and Company, Wilmington, Del., a corporation of Delaware No Drawing. Application October 13, 1955, Serial No. 540,344

5 Claims. (Cl. 260—563)

The present invention relates to novel amines and their preparation. More particularly, the present invention relates to novel triamines, bis(1-aminocycloalkylmethyl) amines, and a method for preparing the same.

In general, amines are used as corrosion inhibitors, in gas purification, and in the formation of emulsifiers for polishes, insecticides, and oils. Moreover, these valuable compounds have also been used in the production of dyes, detergents, textile softeners, and photographic compounds. Recently, amines have found widespread use as curing agents for epoxy resins; however, epoxy resins cured by most amines now commonly used for this purpose are dark, almost black, in color. The dark color of these epoxy resins limits their usefulness in many applications. Moreover, the usefulness of epoxy resin coating compositions containing the common amine curing agents is limited due to the short pot life of these compositions.

Accordingly, an object of the present invention is to provide valuable new amines. Another object of the present invention is to provide valuable new amines by an economically feasible process. A still further object of the present invention is to provide amines which are superior curing agents for epoxy resins. Other objects will become apparent as the invention is further described.

I have found that the foregoing objects may be achieved when I catalytically hydrogenate bis(1-nitrocycloalkylmethyl) amines, which may be prepared according to the method described in detail in my copending application Serial No. 540,343 filed October 13, 1955, by mixing together a nitro cycloalkane, formaldehyde, and ammonia.

In accordance with the process of the present invention, bis(1-nitrocycloalkylmethyl) amines are catalytically hydrogenated at a temperature within the range of the freezing point of the reaction mixture and the boiling point of the reaction mixture and at atmospheric pressure or superatmospheric pressure.

The following examples illustrate specific embodiments of the method of carrying out the process of the present invention. However, they will be understood to be illustrative only and not to limit the invention in any manner. The parts in the examples are parts by weight unless otherwise designated.

Example 1

Sixty parts of bis(1-nitrocyclohexylmethyl)-amine and about 5 parts of Raney nickel were added to 158 parts of absolute ethanol in a Parr shaker, and hydrogen was introduced into the shaker. The hydrogenation was carried out at an initial hydrogen pressure of 60 p. s. i. and at room temperature. When the absorption of hydrogen ceased, the reactor was cooled and vented. The reaction mixture was filtered to remove the catalyst, and the filtrate was distilled to remove the ethanol. The colorless residue was distilled, and 36 parts of a colorless, viscous liquid (boiling point, 131° C. at 0.15 mm.; $n_D^{30}$, 1.5034) was obtained. The yield of bis(1-aminocyclohexylmethyl)amine was 77%.

Example 2

About 15 parts of Raney nickel and 195 parts of bis(1-nitrocyclohexylmethyl)amine were added to 790 parts of methanol in an autoclave. The mixture was stirred at 50–60° C. under a hydrogen pressure of 1000 p. s. i. until the absorption of hydrogen ceased. Then, the reactor was cooled and vented. The reaction mixture was filtered to remove the catalyst, and the filtrate was distilled to remove the ethanol. The residue then was distilled in vacuo, and 122 parts of the colorless, viscous liquid (boiling point, 149–50° C. at 1.0 mm.; $n_D^{29}$, 1.5039) was obtained. The yield of bis(1-aminocyclohexylmethyl)amine was 78%.

The bis(1-aminocyclohexylmethyl)amine was characterized by elemental analysis.

*Analysis.*—Found: C, 70.54, 70.79; H, 11.47, 11.60; N, 17.58. Calcd. for $C_{14}H_{29}N_3$: C, 70.29; H, 12.12; N, 16.72.

The bis(1-aminocycloalkylmethyl)amines were found to be excellent curing agents for epoxy resins. Resins cured by these novel amines were light colored and clear, whereas resins cured by two other amines now used commercially for this purpose (m-phenylenediamine and methylenedianiline) were dark colored and almost opaque. Furthermore, the pot life (time during which the composition remains mobile and free-flowing) of compositions containing the bis(1-aminocycloalkylmethyl) amines is much longer than that of compositions containing the common amine curing agents. In the following table, the pot life of a coating composition containing one of the novel amine curing agents is compared with that of compositions containing the ordinary amine curing agents. In each case, the curing agent was added to a solution consisting of 25 parts of a solid epoxy resin ("Epon" 1001 manufactured by Shell Chemical Company), 25 parts methyl isobutyl ketone, 25 parts xylene, 10 parts butanol, 5 parts of cyclohexanol, and 1 part of a butanol solution of a urea-formaldehyde resin (a flow-control agent).

| Curing agent | Amt.[1] of curing agent (parts) | Time before gelation occurs (pot life) |
|---|---|---|
| Diethylaminopropylamine | 3.75 | 48 hrs. |
| Dimethylaminopropylamine | 2.55 | 24 hrs. |
| Diethylenetriamine | 1.50 | 36 hrs. |
| Bis (1-aminocyclohexylmethyl)-amine | 2.40 | No gelation after 512 hrs. |

[1] The amt. of curing agent was based on the number of amino hydrogens equivalent to the number of epoxide groups in the epoxy resin.

Because of their long pot life, the coating compositions containing the novel triamines remain free-flowing and hence can be stored and used for longer periods of time than ordinary coating compositions. However, when the coated surfaces are heated to curing temperature, 160° C., for a short period of time (ca. 30 minutes), colorless, smooth, hard, flexible, and clear surface coatings are formed. These coatings retain their hardness and flexibility even after exposure to a standard 1.5% detergent solution at 79° C. for 250 hours. A coating prepared by substituting a standard urea-formaldehyde curing agent for the triamines of the present invention was dissolved completely after exposure to the standard detergent solution at 79° C. for 40 hours.

As illustrated by the examples, the bis(1-nitrocycloalkylmethyl) amines are converted to the corresponding triamines in good yields by passing hydrogen through a catalyst-containing solution of one of the dinitro compounds in a suitable solvent. Such solvents include low-molecular-weight alkanols such as methanol, ethanol, and isopropanol; ethers such as dioxane; hydrocarbons such as benzene, cyclohexane, and petroleum ether; and mixtures of a low-molecular-weight alkanol and water such as a 50/50 mixture of ethanol and water. The amount of the solvent is not critical. Usually, about a three-fold amount (by weight based on the weight of the dinitro compound) of solvent is sufficient. The catalyst may be any one of the well known hydrogenation catalysts. Such catalysts include Raney nickel; nickel oxides; finely divided metals of group VIII of the periodic table, such as nickel, iron, cobalt, platinum, palladium, or rhodium; group VIII metals supported on pumice, asbestos, kieselguhr, alumina, silica gel, or charcoal; finely divided copper; copper supported on pumice, asbestos, kieselguhr, alumina, silica gel, or charcoal; palladium or platinum black; colloidal palladium or platinum; and platinum sponge. The amount of catalyst employed depends upon such reaction variables as temperature, pressure, duration of run, etc., and is not critical in that an excess of catalyst has no deleterious effects on the yields obtained by the present process. Moreover, after completion of the hydrogenation, the catalyst may be removed from the reaction mixture by filtration and regenerated by a conventional method. Quantities of catalyst as low as one part per million parts of nitro compound are operable, but larger amounts are preferred in order to permit shorter reaction periods.

The bis(1-nitrocycloalkylmethyl) amines may be hydrogenated at a temperature within the range of the freezing point of the mixture and the boiling point of the mixture under the reaction conditions. However, the use of a temperature within the range of 20° C. and the boiling point of the mixture under the reaction conditions provides good yields and is preferable from the viewpoint of economics. The use of lower temperatures requires external cooling and longer reaction times; the use of higher temperatures may cause the loss of constituents of the mixture.

In effecting the hydrogenation of the dinitro compound, pressures ranging from atmospheric pressure up to the maximum pressure permitted by the mechanical limitations of available equipment can be employed, i. e., 1–1000 atmospheres. Although entirely satisfactory yields of the triamines are obtained when atmospheric pressure is used, the use of higher pressures is advantageous because thereby the reaction rate is increased and the reaction time is decreased.

The bis(1-aminocycloalkylmethyl) amines are separated from reaction mixtures by filtering off the catalyst and insoluble material, distilling off the solvent, and thereafter distilling the residue at reduced pressure.

As illustrated by the examples, a bis(1-nitrocycloalkylmethyl) amine in which the nitrocycloalkyl groups are nitrocyclohexyl can be converted to the corresponding amino compound in good yield by the process of the present invention. However, bis(1-nitrocycloalkylmethyl) amines containing other nitrocycloalkyl groups, e. g., nitrocycloheptyl or nitrocyclopentyl, can also be converted to the corresponding amino compounds by the present process.

Although the preceding examples illustrate the process as a batchwise process, the process of the present invention also may be carried out in a continuous manner. For example, a bis(1-nitrocycloalkylmethyl) amine and a catalyst may be introduced continuously into a reaction zone into which hydrogen is passed continuously and from which the hydrogenation product is removed continuously.

Equally feasible, also, is the combination of the process of the present invention with the process described in my copending application Serial No. 540,343 filed October 13, 1955 by which the bis(1-nitrocycloalkylmethyl) amines are prepared. Accordingly, the hydrogen and a catalyst may be introduced directly into the mixture formed by the reaction of the nitro cycloalkane, formaldehyde, and ammonia, and the triamine thus formed may be separated from the reaction mixture by the previously described method.

The invention has been described in detail in the foregoing. It will be apparent to those skilled in the art that many variations are possible without departure from the scope of the invention. I intend, therefore, to be limited only by the following claims.

I claim:

1. Bis(1-aminocycloalkylmethyl) amines.
2. A process for the preparation of bis(1-aminocycloalkylmethyl) amines which comprises hydrogenating bis-(1-nitrocycloalkylmethyl) amines dissolved in solvent selected from the group consisting of low-molecular-weight alkanols, mixtures of a low-molecular-weight alkanol and water, ethers, and hydrocarbons and in the presence of a hydrogenation catalyst.
3. Process according to claim 2, wherein the hydrogenation catalyst is selected from the group consisting of finely divided metals of group VIII of the periodic table and supported metals of group VIII of the periodic table.
4. Process for the preparation of bis(1-aminocycloalkylmethyl) amines which comprises hydrogenating bis(1-nitrocycloalkylmethyl) amines dissolved in a solvent selected from the group consisting of low-molecular-weight alkanols, mixtures of a low-molecular-weight alkanol and water, ethers, and hydrocarbons and in the presence of a hydrogenation catalyst at a temperature within the range of 20° C. and the boiling point of the mixture under the reaction conditions and at a pressure within the range of atmospheric pressure and 1000 atmospheres.
5. Bis(1-aminocyclohexylmethyl) amine.

References Cited in the file of this patent

UNITED STATES PATENTS

| | | |
|---|---|---|
| 2,132,389 | Bertsch | Oct. 11, 1938 |
| 2,413,153 | O'Loughlin | Dec. 24, 1946 |
| 2,606,925 | Whitman | Aug. 12, 1952 |
| 2,627,491 | Szabo et al. | Feb. 3, 1953 |
| 2,739,981 | Szabo et al. | Mar. 27, 1956 |